United States Patent
Reber

(12) 
(10) Patent No.: US 6,224,916 B1
(45) Date of Patent: May 1, 2001

(54) METHOD OF PRESERVING PLANT MATTER FOR USE AS ANIMAL FEED AND ANIMAL FEED

(75) Inventor: Douglas Lyman Reber, Suffolk (GB)

(73) Assignee: Reber Research & Market Development Co. Ltd., Cambridge (GB)

( * ) Notice: Subject to any disclaimer, the term of this patent is extended or adjusted under 35 U.S.C. 154(b) by 0 days.

(21) Appl. No.: 09/361,508

(22) Filed: Jul. 27, 1999

(30) Foreign Application Priority Data

Apr. 22, 1999 (CA) ................................................ 2269510

(51) Int. Cl.$^7$ ..................................................... A23K 3/02
(52) U.S. Cl. ............................. 426/54; 426/29; 426/623; 426/630; 426/635; 426/807
(58) Field of Search ............................... 426/29, 54, 623, 426/630, 635, 807

(56) References Cited

U.S. PATENT DOCUMENTS

| 3,873,728 | 3/1975 | Moore | 426/2 |
| 4,109,019 | 8/1978 | Moore | 426/69 |
| 5,689,941 | 11/1997 | Gombos et al. | 53/529 |
| 5,736,176 | 4/1998 | Gombos et al. | 426/54 |

FOREIGN PATENT DOCUMENTS

| 0283969 | 9/1988 | (EP) | A23K/1/16 |
| WO9510195A | 4/1995 | (WO) | A23K/1/22 |

OTHER PUBLICATIONS

Beever et al, J. Agri. Sci., vol. 88, Part I, pp 61–70, 1977.*
Uchida Senji, J. Japanese Soc. Grassland Sci., vol. 32(1), pp. 59–65, 1986.*
Hashizume et al., Res. Bull Obihiro Univ Ser I, vol. 9(3), pp. 483–490, 1975.*
Huguet et al. Fourrajes, No. 61, pp 75–105, 1975.*
The effect of drying and partial neutralization of grass silage on voluntary intake by sheep, by Riitta Sormunen–Cristian, Agricultural Science in Finland, vol. 1, No. 2, 1992, pp. 189–194.
D.E. Beever, et al., The digestion by sheep of silages made with and without the addition of formaldehyde, J. Agri Sci., vol. 88, Part I, pp. 61–70, 1977.

* cited by examiner

Primary Examiner—Chhaya D. Sayala
(74) Attorney, Agent, or Firm—Christensen O'Connor Johnson Kindness PLLC

(57) ABSTRACT

A method of preserving plant matter for use as animal feed and animal feed prepared in accordance with the method. A first step involves ensiling live plant matter for a sufficient time duration that the plant matter is preserved as silage. A second step involves dehydrating the silage sufficiently that the dehydrated silage does not spoil when exposed to air. The animal feed derived from following the teachings of this method has unique properties and, in particular, a unique aroma and a unique flavor.

9 Claims, 1 Drawing Sheet

METHOD OF PRESERVING PLANT MATTER FOR USE AS ANIMAL FEED AND ANIMAL FEED

FIELD OF THE INVENTION

The present invention relates to a method of preserving plant matter for use as animal feed and animal feed

BACKGROUND OF THE INVENTION

There are a wide variety of plants that are used as forage and fodder for feeding animals. Common crops include corn, alfalfa, timothy, clover, oats, rye grass, fescue grass, orchard grass, legumes, kale, barley, wheat, sorghum, sudan, canary grass, rhodes grass and mixtures of the foregoing. In addition, there are forages and fodders that are unique to specific geographical regions.

When a forge or fodder crop is harvested, it must be preserved so that it will be available for use in feeding the animals, as required. The preservation method must limit the deterioration of the feed while maximizing retained nutritional value. There are three common alternative methods of preserving forage or fodder crops; sun curing, ensiling or dehydrating. Sun curing is not an option in many part of the world as weather conditions do not permit such curing. The ensiling method of preservation involves fermenting wet forage or fodder in an anaerobic environment. The dehydrating method of preservation involves passing the forage or fodder through dryers to substantially reduce the moisture content. Ensiling provides a number of advantages over both sun curing and dehydrating. Ensiled feed has an aroma and flavour that is attractive to livestock and is moist and tender, which makes it very palatable and easy to digest by livestock. It also retains a higher nutritional value. It has a longer storage life than either dehydrated or sun cured feed, if ensiled and stored properly.

Whether ensiling or dehydrating is used as the method of preservation is often dictated by the distance from the source that the animal feed is to be consumed. Silage has a moisture content of between 35 and 75 percent. Whiles this moisture makes the feed very palatable and easy to digest by livestock, it also makes the feed heavy and bulky, which renders it uneconomical to transport silage over long distances. A further problem in transporting silage over long distances, it that when silage is removed from its anaerobic storage facility and exposed to air, it rapidly spoils. The farther the animal feed is to be consumed from the source, the more likely that dehydrating or, where possible, sun cured processes are used as the method of preservation.

SUMMARY OF THE INVENTION

The present invention describes an alternative method of preserving plant matter for use as animal feed and an animal feed with unique properties made in accordance with the teachings of the method.

According to one aspect of the present invention there is provided a method of preserving plant matter for use as animal feed. A first step involves ensiling live plant matter for a sufficient time duration that the plant matter is preserved as silage. A second step involves dehydrating the silage sufficiently that the dehydrated silage does not spoil when exposed to air.

With the present invention the two known methods of preservation, ensiling and dehydrating, are sequentially combined. It was previously considered that these two methods were mutually exclusive alternatives. By combining the two methods a unique product has been derived, as will hereinafter be further described. It is now possible to transport silage in its dehydrated form. Upon arrival at the destination the silage may be either fed dry or rehydrated prior to feeding. Where the dehydrated silage is to be shipped, it is preferred that a further step be taken of compressing and then binding the dehydrated silage to maintain it in the compressed state. This reduces the total volume of the dehydrated silage in preparation for shipping.

According to another aspect of the present invention there is provided an animal feed which consists in whole or in part of dehydrated silage.

Dehydrated silage has unique properties. The most striking of those properties are that of aroma and flavour. Upon dehydration the silage loses its strong silage aroma and develops a new flavour. The dehydrated silage has a unique aroma. This aroma varies slightly with the amount of moisture that is removed. For example, dehydrated corn silage with a moisture content of less than 5% has an aroma similar to corn flakes cereal. Upon rehydration, the dehydrated silage acquires a stronger aroma; but that aroma and flavour remain distinctive from silage. The aroma and flavour of the dehydrated silage, in both its dry form and a rehydrated wet form, has proven to be attractive to animals. This aroma and flavour can only be produced by the method described herein.

A number of other benefits have been obtained through the use of dehydrated silage as animal feed. It has proven to be much easier to mix different types of silage in their dehydrated from. This has enabled blended animal feeds to be prepared for shipment. Previously, this was not commercially feasible; as silage was consumed close to the source of origin to avoid spoilage, blending could only be done by farmers at the time of feeding.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
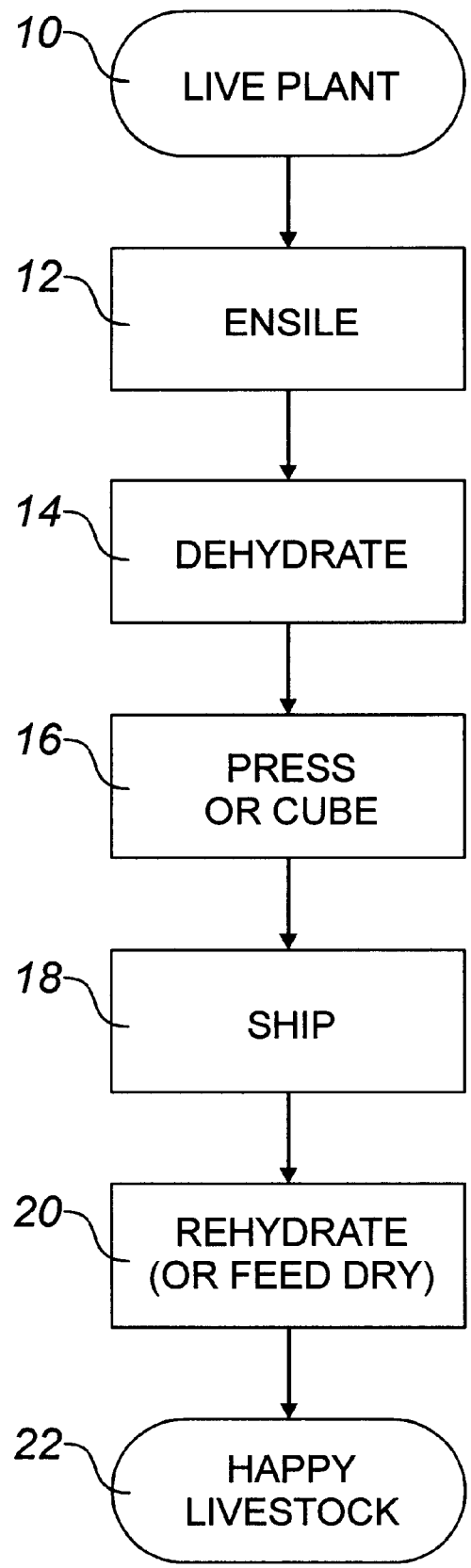
FIG. 1 is a flow diagram of the method of preserving plant matter for use as animal feed in accordance with the teachings of the present invention.

The preferred method of preserving plant matter for use as animal feed will now be described with reference to FIG. 1.

The primary application for the present method is when the silage is being transported. As will hereinafter be further described, the preferred method reduces the weight and volume of the silage. It also reduces the likelihood that the silage will spoil when exposed to air during transport.

Of the various steps that will be described with respect to the present method, there are two steps that are absolutely critical. The other steps represent what are viewed as a best mode for following the teachings of the present method. The first of the two steps is that of ensiling live plant matter for a sufficient time duration that the plant matter is preserved as silage. The second step is that of dehydrating the silage sufficiently that the dehydrated silage does not spoil when exposed to air.

Referring to FIG. 1, with the preferred method live plant matter is harvested and chopped in preparation for ensiling, as indicated by block 10. The live plant matter is then ensiled for a sufficient time duration that the plant matter is preserved as silage, as indicated by block 12. Ensiling of plant matter is well known to persons skilled in the art and will not, therefore, be further described. The silage is then dehydrated sufficiently that the dehydrated silage does not spoil when exposed to air, as indicated by block 14. Dehydrating of plant matter is well known to persons skilled in the art and will not, therefore, be further described. In conventional dehydrating processes a moisture content of between 5% and 15% by weight is viewed as acceptable. The recommended moisture content will vary with the type of plant matter and the requirements of transportation and storage. For most silage, a moisture content of less than 16% by weight will be sufficient to ensure that the dehydrated silage will not spoil when exposed to air. When a feed blend is desired to suit particular nutritional requirements, the dehydrated silage from a variety of plants can be formed into a blend. For example, this might be desirable when the dehydrated silage is intended to meet the needs of a particular end user, such as a dairy farm. The dehydrated silage may be cubed, as indicated by block 16 or it may be pressed to compress it, and then maintained in a pressed state by some other form of binding, such as bagging or confinement within some other from of containment. This step reduces the total volume of the dehydrated silage in preparation for shipping. The dehydrated silage is then shipped, as indicated by block 18. The dehydrated silage can either be fed dry or rehydrated upon arrival at a destination after shipment, as indicated by block 20. When rehydrating the dehydrating silage, one generally endeavours to restore the silage to a moisture content of between 35 to 60 percent by weight. A skilled nutritionist can assist in determining appropriate rehydration. In the absence of such guidance, a general rule to use is that if water can be squeezed from the silage after rehydration, too much water has been added. As previously, described, animal feed derived from dehydrated silage has unique properties. In particular, animal feed derived from dehydrated silage has a unique aroma and a unique flavour. The aroma and flavour of the dehydrated silage, in both its dry form and a rehydrated wet form, has proven to be attractive to animals, as indicated by block 22.

Although the primary application of the present invention is for transportation of silage over long distances, a dairyman may wish to feed rehydrated dehydrated silage when is wet feed stores are depleted, instead of attempting to convert his herd to dry feed. He also could, if desired, feed dehydrated silage in dry form, as an alternative to dehydrated or sun cured feed.

Dehydrated silage in rehydrated wet form, as described above, provides a wet feed option to farms that previously have not had the luxury of wet feed options due to their distance from suitable sources of silage. The method also extends the life of dry feed. It is known that the storage life of wet feed greatly exceeds the storage life of dry feed. Forage can be preserved wet and then subsequently converted to dry feed, as needed. The method addresses supply shortages of dehydrated feed. When farms run out of dry feed stocks during the off season, wet feeds stocks in the form of silage can be converted to dry feed stocks. Dehydrating facilities now operate on a seasonal basis, as they can only operate when fresh forage is harvested. This method enables those facilities to operate year round, working with silage when fresh product is not available.

It will be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. A method of preserving plant matter for use as animal feed, comprising the steps of:

ensiling live plant matter for a sufficient time duration that the plant matter is preserved as silage;

dehydrating the silage sufficiently that the dehydrated silage does not spoil when exposed to air;

shipping the dehydrated silage; and rehydrating the dehydrated silage upon arrival at a destination after shipment.

2. The method as defined in claim 1, the dehydrated silage having a moisture content of less than 16 percent by weight.

3. The method as defined in claim 1, further comprising the step of mixing the dehydrated silage from a variety of plants to form a blend.

4. The method as defined in claim 1, further comprising the step of compressing and binding to maintain in the compressed state the dehydrated silage thereby reducing the total volume of the dehydrated silage in preparation for shipping.

5. A method of preserving plant matter for use as animal feed, comprising the steps of:

chopping live plant matter;

ensiling the live plant matter for a sufficient time duration that the plant matter is preserved as silage;

dehydrating the silage until the dehydrated silage has a moisture content of less than 16 percent by weight so that the dehydrated silage does not spoil when exposed to air; and compressing and binding to maintain in the compressed state the dehydrated silage thereby reducing the total volume of the dehydrated silage in preparation for shipping.

6. The method as defined in claim 5, further comprising the step of mixing the dehydrated silage from a variety of plants to form a blend.

7. A method of preserving plant matter for use as animal feed, comprising the steps of:

chopping live plant matter;

ensiling the live plant matter for a sufficient time duration that the plant matter is preserved as silage;

dehydrating the silage sufficiently that the dehydrated silage does not spoil when exposed to air;

compressing and binding to maintain in the compressed state the dehydrated silage thereby reducing the total volume of the dehydrated silage in preparation for shipping; and rehydrating the dehydrated silage upon arrival at a destination after shipment.

8. An animal feed, comprising:

dehydrated silage having a moisture content of less than 16 percent by weight, the dehydrated silage being compressed and bound to maintain the compressed state.

9. The animal feed as defined in claim 8, wherein the dehydrated silage is a blend from several varieties of plants.

* * * * *